US010169809B2

(12) United States Patent
Yamahara

(10) Patent No.: US 10,169,809 B2
(45) Date of Patent: Jan. 1, 2019

(54) ANSWER FORM PROCESSING SYSTEM, ANSWER FORM PROCESSING METHOD AND COMPUTER STORAGE MEDIUM

(71) Applicant: Rakuten, Inc., Tokyo (JP)

(72) Inventor: Hisanori Yamahara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 268 days.

(21) Appl. No.: 14/388,819

(22) PCT Filed: Feb. 28, 2013

(86) PCT No.: PCT/JP2013/055424
§ 371 (c)(1),
(2) Date: Sep. 29, 2014

(87) PCT Pub. No.: WO2013/146074
PCT Pub. Date: Oct. 3, 2013

(65) Prior Publication Data
US 2015/0058371 A1    Feb. 26, 2015

(30) Foreign Application Priority Data

Mar. 30, 2012  (JP) ................. 2012-082519

(51) Int. Cl.
G06F 17/30      (2006.01)
G06Q 30/06      (2012.01)
G06Q 30/02      (2012.01)

(52) U.S. Cl.
CPC ... G06Q 30/0635 (2013.01); G06F 17/30386 (2013.01); G06Q 30/0201 (2013.01)

(58) Field of Classification Search
CPC .............. G06F 17/30864; G06F 17/30867
See application file for complete search history.

(56) References Cited

U.S. PATENT DOCUMENTS 8,515,888 B2 *  8/2013  Ventilla ............... G06Q 10/10
                                                706/45
2005/0004838 A1 *  1/2005  Perkowski ........... G06Q 30/02
                                                705/14.73

(Continued)

FOREIGN PATENT DOCUMENTS

JP    2001-331403 A    11/2001
JP    2003-099559 A     4/2003
JP    2004-362241 A    12/2004

OTHER PUBLICATIONS

International Search Report for PCT/JP2013/055424 dated Apr. 2, 2013.

Primary Examiner — Loc Tran
(74) Attorney, Agent, or Firm — HEA Law PLLC

(57) ABSTRACT

An answer form capable of saving display space and visibly easy to examine is provided. An answer form processing method includes the steps of obtaining a question form including one or more lines of a question sentence and a plurality of consecutive lines of options, obtaining an answer form that indicates an answer for the question sentence from an answerer, the answer form being generated by adding one or more characters to the one or more lines in the question form, each of the lines indicating the option, comparing the question form and the answer form on a line-by-line basis, and outputting at least a part of each line in the answer form while restricting output of the line which matches the corresponding line in the question form, thereby outputting the answer form where the line indicating the option to which one or more characters are not added by the answerer is omitted.

19 Claims, 12 Drawing Sheets

(56) References Cited

U.S. PATENT DOCUMENTS

| | | | |
|---|---|---|---|
| 2009/0183237 A1* | 7/2009 | Cortes | G06F 9/453 726/4 |
| 2009/0286219 A1* | 11/2009 | Kisin | G06Q 10/06 434/362 |

* cited by examiner

FIG.3

| ITEM | PRICE | QUANTITY | SUBTOTAL |
|---|---|---|---|
| ABC TRICYCLE | 12,000 | 1 | 12,000 |

ORDER REVIEW SCREEN

TOTAL  12,000

ORDERER INFORMATION

NAME ~16

ADDRESS ~18

TELEPHONE NUMBER ~20

NOTES

<1 : GIFT WRAP>
PLEASE PLACE A CIRCLE IN () IF YOU HAVE A REQUEST.
RIBBON ( )
WRAPPING PAPER ( )
MESSAGE CARD(500 YEN) ( )

<2 : DELIVERY DAY>
PLEASE PLACE A CIRCLE IN () IF YOU HAVE A REQUEST.

~22

24
NEXT

FIG.4

```
 ┌ < 1 : GIFT WRAP >
30┤  PLEASE PLACE A CIRCLE IN () IF YOU HAVE A REQUEST.
 └  RIBBON        ()
 ┌  WRAPPING PAPER  ()
32┤  MESSAGE CARD (500 YEN)  ()
 └
 ┌  < 2 : DELIVERY DAY >
34┤  PLEASE PLACE A CIRCLE IN () IF YOU HAVE A REQUEST.
 └  MONDAY       ()
 ┌  TUESDAY      ()
 │  WEDNESDAY    ()
36┤  THURSDAY     ()
 │  FRIDAY       ()
 │  SATURDAY     ()
 └  SUNDAY       ()
```

FIG.5

```
< 1 : GIFT WRAP >
PLEASE PLACE A CIRCLE IN () IF YOU HAVE A REQUEST.
RIBBON           ()
WRAPPING PAPER   (O)
MESSAGE CARD (500 YEN)   (O)

< 2 : DELIVERY DAY >
PLEASE PLACE A CIRCLE IN () IF YOU HAVE A REQUEST.
MONDAY       ()
TUESDAY      ()
WEDNESDAY    ()
THURSDAY     (O)
FRIDAY       ()
SATURDAY     (O)
SUNDAY       ()
```

FIG.6

```
                REVIEW ORDER

NAME         TARO YAMADA

ADDRESS      XXXXXX, SHINJUKU-KU, TOKYO

TELEPHONE    03-××××-××××
  NUMBER

NOTES        WRAPPING PAPER (O)
               MESSAGE CARD (500 YEN) (O)
               THURSDAY (O)
               SATURDAY (O)

```
              ORDER INFORMATION

NAME         TARO YAMADA

ADDRESS      XXXXXX, SHINJUKU-KU, TOKYO

TELEPHONE    03-××××-××××
  NUMBER

NOTES        WRAPPING PAPER (O)    (O)
               MESSAGE CARD (500 YEN)
               THURSDAY (O)
               SATURDAY (O)

[ NEXT ]──42
```

FIG.15

```
< 1 : GIFT WRAP>
PLEASE PLACE A CIRCLE IN () IF YOU HAVE A REQUEST.
WRAPPING PAPER  (O)
MESSAGE CARD (500 YEN)  (O)
< 2 : DELIVERY DAY>
PLEASE PLACE A CIRCLE IN () IF YOU HAVE A REQUEST.
THURSDAY  (O)
SATURDAY  (O)
```

FIG.16

```
< 1 : GIFT WRAP >
PLEASE PLACE A CIRCLE IN () IF YOU HAVE A REQUEST.
RIBBON  ()
WRAPPING PAPER  (O)
MESSAGE CARD (500 YEN)  (O)

< 2 : DELIVERY DAY >
PLEASE PLACE A CIRCLE IN () IF YOU HAVE A REQUEST.
MONDAY      ()
TUESDAY     ()
WEDNESDAY   ()
THURSDAY    ()
FRIDAY      ()
SATURDAY    ()
SUNDAY      ()
```

FIG.17

```
< 1 : GIFT WRAP>
WRAPPING PAPER  (O)
MESSAGE CARD (500 YEN)  (O)
< 2 : DELIVERY DAY>
NO ENTRY
```

<GIFT WRAP>
PLEASE PLACE A CIRCLE IN () IF YOU HAVE A REQUEST.
RIBBON ()
WRAPPING PAPER ()
MESSAGE CARD (500 YEN) ()

<GIFT WRAP>
PLEASE PLACE A CIRCLE IN () IF YOU HAVE A REQUEST.
RIBBON ()
WRAPPING PAPER (○)
MESSAGE CARD (500 YEN) (○)

FIG.22

```
PLEASE PLACE A CIRCLE IN () IF YOU HAVE A REQUEST.
MONDAY     ()
TUESDAY    ()
WEDNESDAY  ()
THURSDAY   ()
FRIDAY     ()
SATURDAY   ()
SUNDAY     ()
```

FIG.23

```
PLEASE PLACE A CIRCLE IN () IF YOU HAVE A REQUEST.
MONDAY     ()
TUESDAY    ()
WEDNESDAY  ()
THURSDAY   (O)
FRIDAY     ()
SATURDAY   (O)
SUNDAY     ()
```

… # ANSWER FORM PROCESSING SYSTEM, ANSWER FORM PROCESSING METHOD AND COMPUTER STORAGE MEDIUM

CROSS REFERENCE TO RELATED APPLICATIONS

This application is a National Stage of International Application No. PCT/JP2013/055424 filed Feb. 28, 2013, claiming priority based on Japanese Patent Application No. 2012-082519 filed on Mar. 30, 2012. The contents of each of the above documents are incorporated herein by reference in their entirety.

TECHNICAL FIELD

The present invention relates to an answer form processing system, an answer form processing method and a computer storage medium.

BACKGROUND ART

FIG. 22 shows an example of a question form that is shown to a purchaser of an item on an e-commerce site. The question form is created on a computer in a text format by staff of a shop managing the e-commerce site. In the example of a question form shown in FIG. 22, a question sentence is placed at the head of lines in order to ask the purchaser if he/she has any request for a delivery date. The lines of options for delivery dates follow the question sentence. Text data of the question form is displayed on the purchaser's computer at the time of purchasing the item. The purchaser moves a cursor to any position on the question form with use of an input device, to thereby add or delete characters.

FIG. 23 shows an example of an answer from the purchaser in reply to the question form, that is, an example of an answer form. As shown in FIG. 23, pursuant to the direction "please place a circle if you have a request for delivery date" in the question form, the purchaser adds a character in a parenthesis corresponding to one of the options included in the question form, thereby creating an answer form in text format for informing the shop staff of a wish to select the option. Such answer form is received and displayed on the computer of the shop, thereby enabling the shop staff to check the request for the delivery date etc. from the purchaser of the item.

SUMMARY OF INVENTION

Technical Problem

However, among the options presented to the purchaser, what is important to the shop staff who has received the answer form is the portions to which the purchaser has added characters such as circles or crosses, that is, options actually selected by the purchaser. Displaying other options, to which such characters are not added, is unnecessary for the shop staff as well as consumes display space and distract the shop staff from smoothly confirming the answer form.

For general text tools, programs called Winmerge, which highlights differences between old and new versions of the file, or FC and DIFF, which output and contrastively display differences between old and new versions of the file, are known. In these programs, however, in addition to the new version of the file, at least portions of the old version of the file corresponding to the changed portions of the new version are also displayed. As a result, display space is still consumed and the answer form is not smoothly examined.

One or more embodiments of the present invention have been conceived in view of the above, and an object thereof is to provide an answer form processing system, an answer form processing method and a computer storage medium capable of saving display space and outputting an answer form that is visibly easy to examine.

Solution to Problem

In order to solve the above described problems, an answer form processing system according to an embodiment of the present invention includes means for obtaining a question form that includes one or more lines of a question sentence and a plurality of lines of options corresponding to the question sentence, means for obtaining an answer form that indicates an answer for the question sentence from an answerer, the answer form being generated by adding one or more characters to the one or more lines indicating the plurality of options in the question form, means for comparing the question form and the answer form on a line-by-line basis with respect at least to the plurality of lines each of which indicates one of the plurality of options, and outputting means for outputting at least a part of each line in the answer form while restricting output of the line, which is among the plurality of lines respectively indicating the plurality of options and matches the corresponding line in the question form, thereby outputting the answer form where the line indicating the option to which one or more characters are not added by the answerer is omitted.

According to the embodiment of the present invention, the answer form processing system further includes question line specifying means for specifying at least one of the plurality of lines indicating the question sentence in the answer form, wherein the outputting means does not restrict output of the line specified by the question line specifying means in the answer form.

The question line specifying means may specify a line that matches a predetermined condition as a question sentence in the answer form.

Alternatively, the question line specifying means may specify the plurality of lines respectively indicating the plurality of the options in the question form, and also specify at least one of the lines indicating the question sentence based on positions of the specified lines. In this regard, in a case where a plurality of lines that match the predetermined condition are consecutive, the question line specifying means may specify the consecutive lines as the plurality of lines respectively indicating the plurality of options in the question form.

According to the embodiment of the present invention, the outputting means does not restrict output of the line, in the answer form, that matches the corresponding line in the question form based on an amount of text in the question form or the answer form.

According to the embodiment of the present invention, the outputting means outputs a predetermined message in a case where there is no line, in the answer form, that does not match the corresponding line in the question form.

An answer form processing method according to the embodiment of the present invention includes the steps of obtaining a question form that includes one or more lines of a question sentence and a plurality of lines of options corresponding to the question sentence, obtaining an answer form that indicates an answer for the question sentence from an answerer, the answer form being generated by adding one or more characters to the one or more lines indicating the plurality of options in the question form, comparing the question form and the answer form on a line-by-line basis with respect at least to the plurality of lines each of which indicates one of the plurality of options, and outputting at least a part of each line in the answer form while restricting output of the line, which is among the plurality of lines respectively indicating the plurality of options and matches the corresponding line in the question form, thereby outputting the answer form where the line indicating the option to which one or more characters are not added by the answerer is omitted.

A program according to the embodiment of the present invention causes a computer to perform the steps of obtaining a question form that includes one or more lines of a question sentence and a plurality of lines of options corresponding to the question sentence, obtaining an answer form that indicates an answer for the question sentence from an answerer, the answer form being generated by adding one or more characters to the one or more lines indicating the plurality of options in the question form, comparing the question form and the answer form on a line-by-line basis with respect at least to the plurality of lines each of which indicates one of the plurality of options, and outputting at least a part of each line in the answer form while restricting output of the line, which is among the plurality of lines respectively indicating the plurality of options and matches the corresponding line in the question form, thereby outputting the answer form where the line indicating the option to which one or more characters are not added by the answerer is omitted. The program may be stored in a computer readable storage medium such as a CD-ROM or a DVD-ROM.

A data processing system according to the embodiment of the present invention includes means for obtaining first data that includes one or more lines of a sentence and a plurality of lines of options corresponding to the sentence, means for obtaining second data that indicates a selection, which is generated by adding data to the one or more lines indicating the plurality of options in the first data, means for comparing the first data and the second data on a line-by-line basis with respect at least to the plurality of lines each of which indicates one of the plurality of options, and outputting means for outputting at least a part of each line in the second data while restricting output of the line, which is among the plurality of lines respectively indicating the plurality of options and matches the corresponding line in the first data, thereby outputting the second data where the line indicating the option to which the data is not added is omitted.

A data processing method according to the embodiment of the present invention includes the steps of obtaining first data that includes one or more lines of a sentence and a plurality of lines of options corresponding to the sentence, obtaining second data that indicates a selection, which is generated by adding data to the one or more lines indicating the plurality of options in the first data, comparing the first data and the second data on a line-by-line basis with respect at least to the plurality of lines each of which indicates one of the plurality of options, and outputting at least a part of each line in the second data while restricting output of the line, which is among the plurality of lines respectively indicating the plurality of options and matches the corresponding line in the first data, thereby outputting the second data where the line indicating the option to which the data is not added is omitted.

A program according to the embodiment of the present invention causes a computer to perform the steps of obtaining first data that includes one or more lines of a sentence and a plurality of lines of options corresponding to the sentence, obtaining second data that indicates a selection, which is generated by adding data to the one or more lines indicating the plurality of options in the first data, comparing the first data and the second data on a line-by-line basis with respect at least to the plurality of lines each of which indicates one of the plurality of options, and outputting at least a part of each line in the second data while restricting output of the line, which is among the plurality of lines respectively indicating the plurality of options and matches the corresponding line in the first data, thereby outputting the second data where the line indicating the option to which the data is not added is omitted. The program may be stored in a computer readable storage medium such as a CD-ROM or a DVD-ROM.

Advantageous Effects of Invention

According to the embodiment of the present invention, the answer form is generated such that the plurality of lines respectively indicating the options to which one or more character are not added by the answerer are omitted, thereby saving display space and making the answer form visibly easy to examine.

BRIEF DESCRIPTION OF DRAWINGS

FIG. 3 A diagram illustrating an example of an order information input screen.

FIG. 4 A diagram illustrating an example of a question form.

FIG. 5 A diagram illustrating an example of an answer form.

FIG. 6 A diagram illustrating an example of a review screen for a purchaser.

FIG. 7 A diagram illustrating an example of an order review screen for shop staff.

FIG. 15 A diagram illustrating an example of the revised answer form according to the variation 2 of the present invention.

FIG. 16 A diagram illustrating another example of the answer form.

FIG. 17 A diagram illustrating an example of the revised answer form according to variation 3 of the present invention.

FIG. 22 A diagram illustrating an example of the question form.

FIG. 23 A diagram illustrating an example of the answer form.

DESCRIPTION OF EMBODIMENTS

An embodiment of the present invention will be described below in detail with reference to the accompanying drawings.

Figure 1:
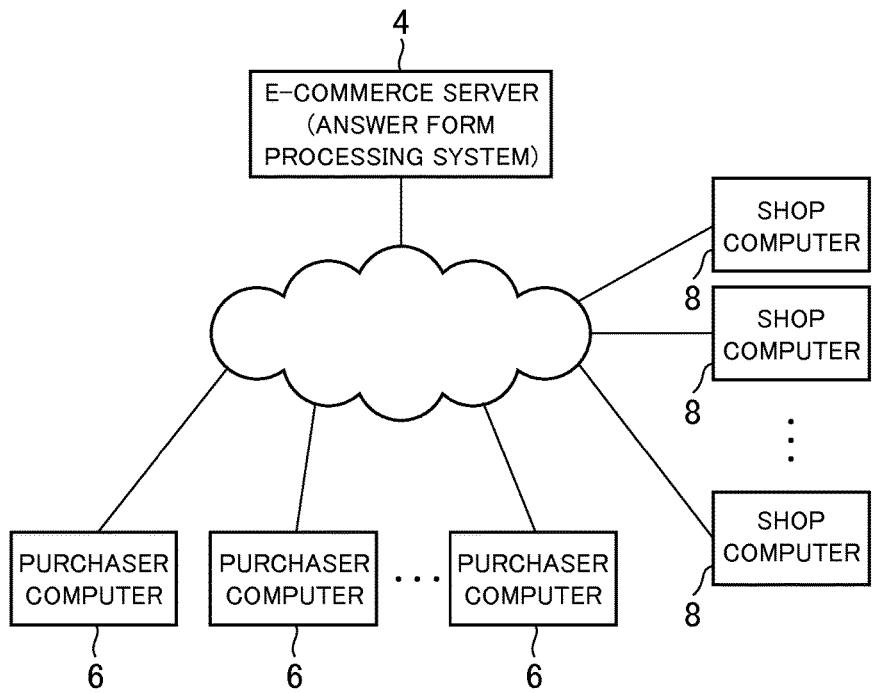
FIG. 1 A diagram illustrating the overall configuration of an e-commerce system according to an embodiment of the present invention.

FIG. 1 is a diagram illustrating the overall configuration of an e-commerce system according to an embodiment of the present invention. An e-commerce system 1 shown in FIG. 1 includes an e-commerce server 4 mainly configured with a computer such as a server computer, a plurality of purchaser computers 6 each of which mainly configured with a computer such as a personal computer, a mobile phone, and a smartphone, and a plurality of shop computers 8 each of which mainly configured with a computer such as personal computer, a mobile phone, and a smartphone. Here, the e-commerce server 4 incorporates an answer form processing system, which is an embodiment of the present invention. All of the e-commerce server 4, the purchaser computers 6, and the shop computers 8 are connected to a communication network 10 capable of data communication such as the Internet, and are capable of mutually exchanging data. The purchaser computer 6 and the shop computer 8 are installed with web browsers, and access the e-commerce server 4, thereby receiving data of a web page from the e-commerce server 4 and displaying the web page on a display. In the e-commerce system 1, a virtual shopping mall is constructed on the e-commerce server 4, and shop owners respectively having the shop computers 8 operate their virtual shops at the shopping mall. That is, each shop computer 8 records, at the e-commerce server 4, information online of items, for example, price, details of items, and shipping date, with use of the web browser. Upon receiving a request from the purchaser computer 6, the e-commerce server 4 provides information from the shops in web forms. The user of the purchaser computer 6 determines an item to purchase based on the provided information, and specifies the delivery address and payment option with use of the web browser. Processing of the delivery and payment is also performed by the e-commerce server 4, and shops can check any time the result of the processing using a web browser of each shop computer 8.

Figure 2:
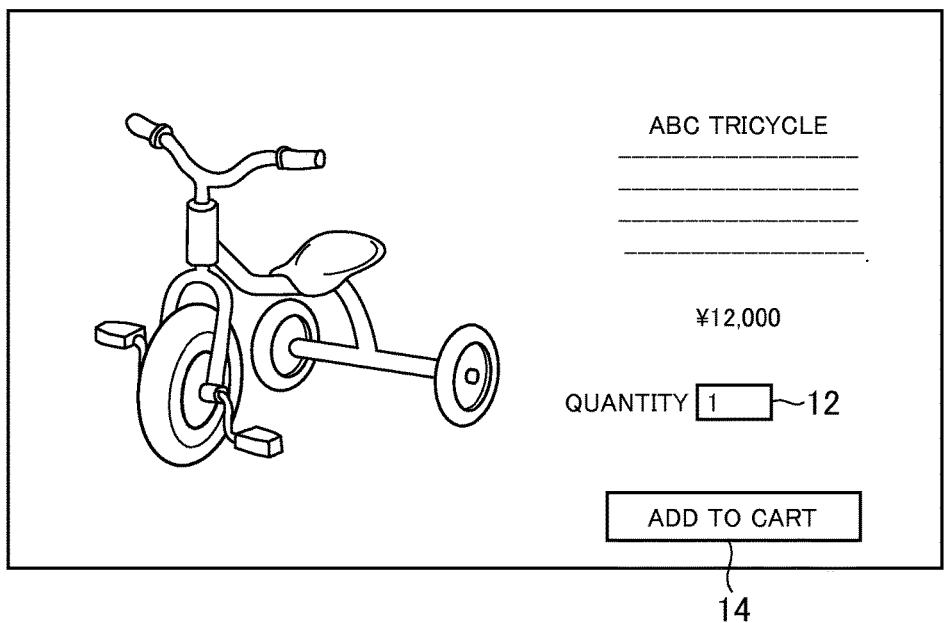
FIG. 2 A diagram illustrating an example of an item screen.

FIG. 2 shows an example of an item screen provided by the e-commerce server 4 to the purchaser computer 6. The screen is displayed on the web browser of the purchaser computer 6 based on the web page data sent from the e-commerce server 4. For example, the item screen is displayed on the purchaser computer 6 by following a link on the top page of the e-commerce server 4 (not shown), or clicking a link button included in a search result list. The screen displays item information, such as an image, description, and price of the item. When purchasing an item, the purchaser inputs quantity into an input form 12 and clicks a button 14, thereby storing an ID of the item displayed on the screen into a temporary storage area of the e-commerce server 4 in association with the purchaser computer 6 or the ID of the purchaser. In this way, conceptually, the item is put in a shopping cart.

The screens provided to the purchaser computer 6 include buttons to access the shopping cart. By clicking the button, an order information input screen shown in FIG. 3 is displayed on the purchaser computer 6. This screen is displayed on the web browser of the purchaser computer 6 based on the web page data sent from the e-commerce server 4, and provided for the purchaser to input information required for purchasing the item already in the shopping cart. That is, as shown in FIG. 3, the screen includes the name and price of the item that is specified by the ID stored, in the storage area of the e-commerce server 4 for the shopping cart, in association with the ID of the purchaser computer 6 or the purchaser. In addition, the screen includes input forms 16, 18, and 20 for inputting the purchaser's name, address, and phone number. The purchaser inputs their name, address, and phone number into the input forms 16, 18, and 20 respectively using an input device, such as a keyboard, of the purchaser computer 6. The order information input screen further includes an input form 22, in which a plurality of lines of text can be input, for inputting any other information. The input form 22 has default text of the question form that is sent from the shop computer 8 in advance. As such, the input form 22 is displayed in a state where the text of the question form is already input. The purchaser moves a cursor within the input form 22 using the input device of the purchaser computer 6, such as a keyboard or a mouse, thereby adding or deleting any characters at the position of the cursor. In the example shown in FIG. 3, the number of lines of the text in the input form 22 is smaller than the number of lines of the text in the question form. As such, a scroll bar is displayed on the right side of the input form 22. By operating the scroll bar, any portion of the text in the question form can be displayed in the input form 22.

FIG. 4 shows an example the text (text data) of the question form, which is sent from each shop computer 8 and recorded at the e-commerce server 4 in advance. The text is stored in the e-commerce server 4 in association with the shop computer 8 or the shop itself. When data of the web page of the order information input screen shown in FIG. 3 is generated, the text of the question form, which is stored in advance in association with the shop that sells the item to be ordered or the shop computer 8, is read out, and the text is set as the default value for the input form 22.

In the example shown in FIG. 4, the question form includes question sentences 30 described in two lines on the top, and question sentences 34 described in two lines on the middle. A group of options 32 described in a plurality of lines is arranged below the question sentences 30, and a group of options 36 described in a plurality of lines is arranged below the question sentences 3. Each line of the options 32 and 36 shows an option for the purchaser.

Line 1 of the question sentences 30 describes "1: Gift Wrap", and line 2 describes "please place a circle if you have a request for gift wrap." Line 1 of the options 32 describes "ribbon ( )", and line 2 describes "wrapping paper ( )", and line 3 describes "message card (500 YEN) ( )." In other words, the question sentences 30 ask if the purchaser has a request for gift wrap of the item, followed by three options: putting a ribbon on the box of the item, wrapping the box of the item with paper, and sending a message card with the item. When the purchaser wishes to put a ribbon on the box, the purchaser adds "○" in "( )" described in line 1 of the options 32 to change "( )" to "(○)." When the purchaser wishes to wrap the box with paper, the purchaser adds "○" in "( )" described in line 2 of the options 32 to change "( )" to "(○)." When the purchaser wishes to add a paid message card to the box, the purchaser adds "○" in "( )" described in line 3 of the options 32 to change "( )" to "(○)." Here, not only one of the three options but multiple options may be selected at one time. However, depending on the questions and options, only one of the options should naturally be selected.

Similarly, line 1 of the question sentences 34 describes "2: Delivery day", and line 2 describes "please place a circle if you have a request for delivery day." Lines 1-7 of the options 36 describe "Monday ( )", "Tuesday ( )", "Wednesday ( )", "Thursday ( )", "Friday ( )", "Saturday ( )", "Sunday ( )", respectively. In other words, the question sentences 34 ask the purchaser which day of the week they wish to receive the item, followed by seven options from Monday to Sunday. The purchaser adds "○" in "( )" in the option of the desired day, thereby sending a request of the delivery day of the week to the shop. Here again, not only one of the seven options but multiple options may be selected at one time.

The data of the question form shown in FIG. 4 is set as the default value of the input form 22 on the order information input screen shown in FIG. 3, and the user can input characters in any portions as described above. The user inputs the character "○" according to the question sentences 30 and 34, and as a result, the revised question form, that is, data of an answer form is generated. FIG. 5 shows an example of data of an answer form. According to the data of the answer form shown in FIG. 5, the purchaser wishes to add wrapping paper and a paid message card as gift wrap, and selects Thursday and Saturday as a delivery day of the week.

In the order information input screen shown in FIG. 3, the purchaser inputs their name, address, and phone number in the input forms 16, 18, and 20 respectively, and inputs the character "○" in the parenthesis of the desired option in the input form 22 for the remarks. Subsequently, when the purchaser clicks the button 24, data of each of input forms 16, 18, 20, and 22 is sent to the e-commerce server 4 from the purchaser computer 6. The received data of the input forms 16, 18, 20, and 22 is temporary stored, and the e-commerce server 4 returns a review screen shown in FIG. 6 to the purchaser computer 6. The review screen is displayed on the web browser of the purchaser computer 6 based on the web page data sent from the e-commerce server 4. The web page data is generated based on the content of input forms 16, 18, 20, and 22 sent to the e-commerce server 4 from the purchaser computer 6. The review screen shows the name, address, and phone number that the purchaser has respectively input in the input forms 16, 18, and 20, and only a portion of the input form 22. Specifically, the review screen shows only lines to which the purchaser adds the character "○". In this way, it is possible to save space for displaying the answer form on the review screen. In addition, only the lines to which the purchaser adds the character "○" are displayed, and thus the purchaser can immediately understand which options they have selected. By clicking the button 40, it is possible to inform the e-commerce server 4 that the content of the review screen is correct. In this way, the temporarily stored name, address, phone number, and answer form are definitely stored in the e-commerce server 4 as order information.

The order information stored as described above is also provided to the shop computer 8. That is, when the shop staff accesses the e-commerce server 4 using the web browser of the shop computer 8, the web page indicating the stored order information is sent to the shop computer 8. FIG. 7 shows an example of an order review screen displayed on the shop computer 8 based on the web page that is sent as described above. Similarly to the review screen shown in FIG. 6, the order review screen shows the name, address, and phone number that the purchaser has respectively input in the input forms 16, 18, and 20, and only a portion of the input form 22. Specifically, the review screen shows only lines to which the purchaser adds the character "○". In this way, it is possible to save space for displaying the answer form on the order review screen. In addition, only the lines to which the purchaser adds the character "○" are displayed, and thus the shop staff can immediately understand which options the purchaser has selected. By clicking the button 42 on the order review screen, for example, an order review screen regarding another order is displayed on the shop computer 8.

Figure 8:
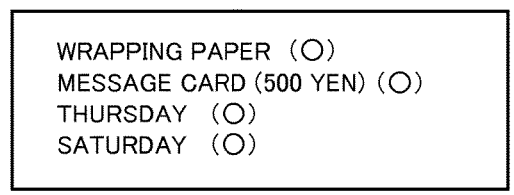
FIG. 8 A diagram illustrating an example of a revised answer form.

As described above, in order to display only the lines of the answer form to which the purchaser adds the character "○", the e-commerce server 4 internally generates data of the revised answer form based on data of the question form and data of the answer form. FIG. 8 shows data of the revised answer form that is generated for the review screen shown in FIG. 6 and the order review screen shown in FIG. 7. The e-commerce server 4 compares content of the nth line of the answer form with content of the nth line (n is a number from 1 to the total number of lines in answer form) of the question form. If they are the same, the nth line of the answer form is not included in data of the revised answer form, and only if they are different, the nth line of the answer form is included in data of the revised answer form. As such, the data of the revised answer form is generated such that the lines of the options to which the character "○" is not added by the purchaser, who is an answerer, are omitted whereby the remaining lines are disposed adjacent in a line-by-line manner. In other word, the lines to which the answerer has added the character are coupled together according to the original order to generate data of the revised answer form. Subsequently, the data of the revised answer form is included in the review screen shown in FIG. 6 or the order screen shown in FIG. 7, and displayed on the purchaser computer 6 or the shop computer 8.

In the above, each line of options has "( )", however other types of parentheses, such as "[ ]" or "{ }", may be used. Alternatively, parentheses may not necessarily be described. In this case, the purchaser, who is the answerer, may be caused to add a character such as "○" after each option words. The character added to the line of the option may not be limited to "○", but may be other characters such as "X" and "Y". The character may, of course, include a plurality of letters, such as "YES". The revised answer form as described above includes the line of the answer form to which the purchaser has added the character "○" as it is, however "(○)" may be deleted when the line is included in the revised answer form.

Figure 9:
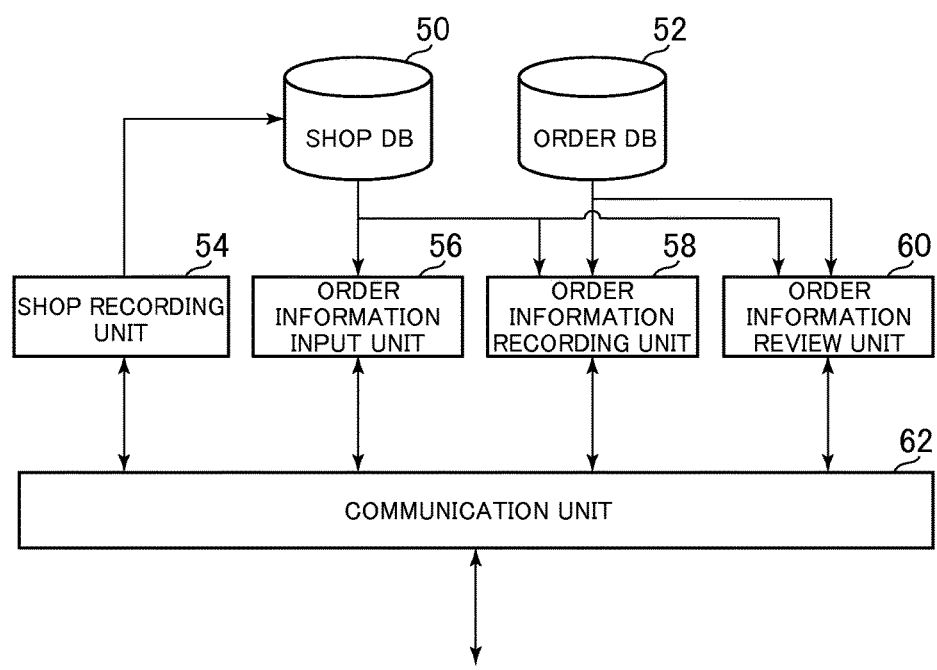
FIG. 9 A diagram illustrating an example of the functional configuration of an e-commerce server (answer form processing system).

In the following, specific processing for generating the review screen shown in FIG. 6 and the order review screen shown in FIG. 7 will be described. FIG. 9 illustrates a functional block diagram of the e-commerce server 4. As shown in FIG. 9, the e-commerce server 4 functionally includes a shop database 50, an order database 52, a shop recording unit 54, an order information input unit 56, an order information recording unit 58, an order information review unit 60 and a communication unit 62. The communication unit 62 sends and receives data with the purchaser computer 6 and the shop computer 8 through the communication network 10. These elements are implemented by installing a program, which is an embodiment of the present invention, on the e-commerce server 4 and executing the program. The program may be downloaded from other computer through the communication network 10, or installed from a computer readable storage medium such as a CD-ROM or a DVD-ROM.

In addition to the elements shown in FIG. 9, the e-commerce server 4 includes other functional elements, such as item management or settlement for operating a virtual shopping mall. These functional elements can be of any constitution known in the art. As such, this embodiment mainly shows the review screen shown in FIG. 6 and the portion relating to generating the order review screen shown in FIG. 7, which are the features of this embodiment, that is, the portion relating to the answer form processing system.

In FIG. 9, upon receiving a request from a shop computer 8, the shop recording unit 54 sends to the shop computer 8 the web page data of the information recording screen for recording the question form through the communication unit 62. At the shop computer 8, the data of the question form is input in the information recording screen. When the button on the screen is clicked, the data of the question form is returned to the shop recording unit 54. The shop recording unit 54 converts the data of the question form received in this manner into a text file format shown in FIG. 4, and causes the shop database 50 to store the data for each shop. Upon receiving a request from a purchaser computer 6, the order information input unit 56 sends to the purchaser computer 6 the web page data of the order information input screen shown in FIG. 3 through the communication unit 62. At this time, the order information input unit 56 reads out the data of the question form from the shop database 50, and sets the data as a default value of the input form 22 of the order information input screen.

When the button 24 on the order information input screen is clicked, content of the input forms 16, 18, 20, and 22 is sent to the e-commerce server 4 from the purchaser computer 6, and the communication unit 62 passes the information to the order information recording unit 58. The order information recording unit 58 temporarily stores the received information, that is, the name, address, and phone number of the purchaser and the answer form. Based on the received information, the order information recording unit 58 generates the web page data of the review screen shown in FIG. 6 and sends the generated data to the purchaser computer 6. At this time, the review screen includes the data of the revised answer form. The data of the revised answer form is generated by the order information recording unit 58 such that the order information recording unit 58 obtains the data of the question form stored in the shop database 50 and the temporarily stored data of the answer form, and executes revised answer form generation processing (FIG. 10) described below based on the obtained data. When the button 40 is clicked on the review screen, the order information recording unit 58 records the temporarily stored name, address, phone number and the answer form into the order database 52.

Upon receiving a request from a shop computer 8, the order information review unit 60 sends web page data of the order review screen shown in FIG. 7 through the communication unit 62. At this time, the order review screen also includes the data of the revised answer form. The data of the revised answer form is generated by the order information review unit 60 such that the order information review unit 60 obtains the data of the question form stored in the shop database 50 and the data of the answer form stored in the order database 52, and executes revised answer form generation processing (FIG. 10) described below based on the obtained data.

Figure 10:
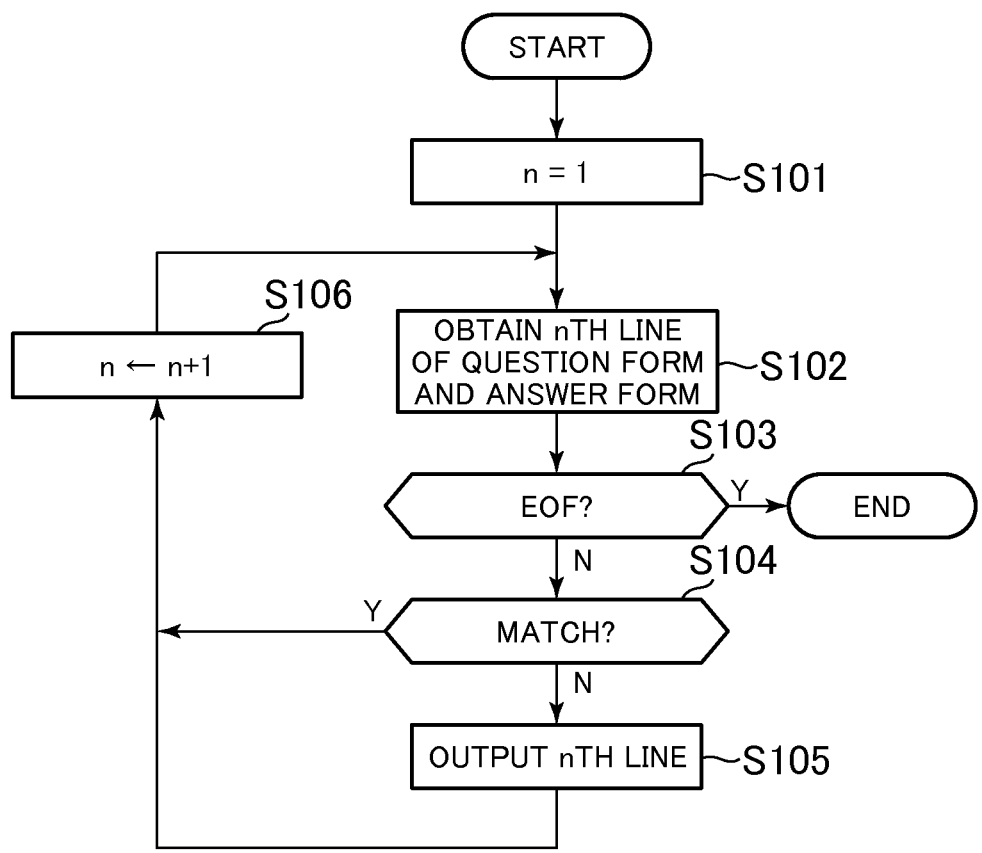
FIG. 10 A diagram illustrating a flow chart of answer form processing.

In the following, the revised answer form generation processing will be described. FIG. 10 is a flow chart of the revised answer form generation processing executed by the order information recording unit 58 and the order information review unit 60. As shown in FIG. 10, in the processing, 1 is substituted for a variable n, which indicates the number of lines (S101). Subsequently, data of nth line is extracted from each of the question form data and the answer form data (S102). At this time, if the data of nth line of the answer form is EOF (End Of File), processing is ended (S103). If not, the pieces of data extracted in S102 are compared to determine whether or not the pieces of data match (S104). If the pieces of data match, the variable n is incremented by 1 (S106), and the processing returns to S102. If the pieces of data do not match, the data of the nth line of the answer form is added to the end of the data of the revised answer form (S105). Subsequently, the variable n is incremented by 1 (S106), and the processing returns to S102. With the above processing, the data of the revised answer form is generated such that the lines to which the character "∘" is not added by the purchaser are omitted whereby the remaining lines are disposed adjacent in a line-by-line manner.

Figure 11:
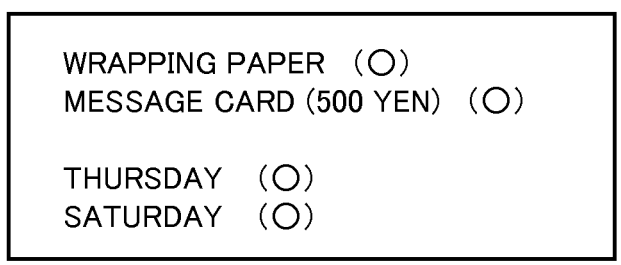
FIG. 11 A diagram illustrating an example of the revised answer form according to variation 1 of the present invention.

The format of the revised answer form is not limited to the one shown in FIG. 8, but other variations may also be available. For example, as shown in FIG. 11, a blank line may be inserted between pairs of the question sentence and the options. In this way, it is possible to easily recognize which answer belongs to which question. In the example of the question form shown in FIG. 4, blank lines are inserted between the first question sentences 30 and the group of options 32, and between the second question sentences 34 and the group of options 36. As such, in the flow chart of FIG. 10, even though the nth line of the question form matches the nth line of the answer form in S104, if these lines are blank (lines include only line feed codes), the blank lines may be exceptionally added to the end of the data of the revised answer form. That is, the data of the revised answer form is generated such that the lines to which the answerer has added the character are coupled with the blank lines according to the original order. In this way, the revised answer form shown in FIG. 11 is generated.

Alternatively, in the revised answer form generation processing, lines suggesting question sentences in the answer form may be specified to be included in the revised answer form without restricting output of the specified lines of the question sentences in the answer form. In order to specify the lines of the question sentences, for example, lines in the answer form satisfying the predetermined condition may be specified as the lines suggesting the question sentences. Here, since the first line of each of the question sentences 30 and 34 starts with "<", a line satisfying the condition "including < at the beginning of the line" may be specified as the line of the question sentences to be included in the revised answer form. In addition, a shop that creates a question form may be notified of a condition (e.g., including an asterisk at the beginning of the line) of a line of the question sentences to be included in the revised answer form. If the shop follows the condition to create the question form, the line satisfying the condition may be specified as the line of the question sentences to be included in the revised answer form.

Figures 12, 13:
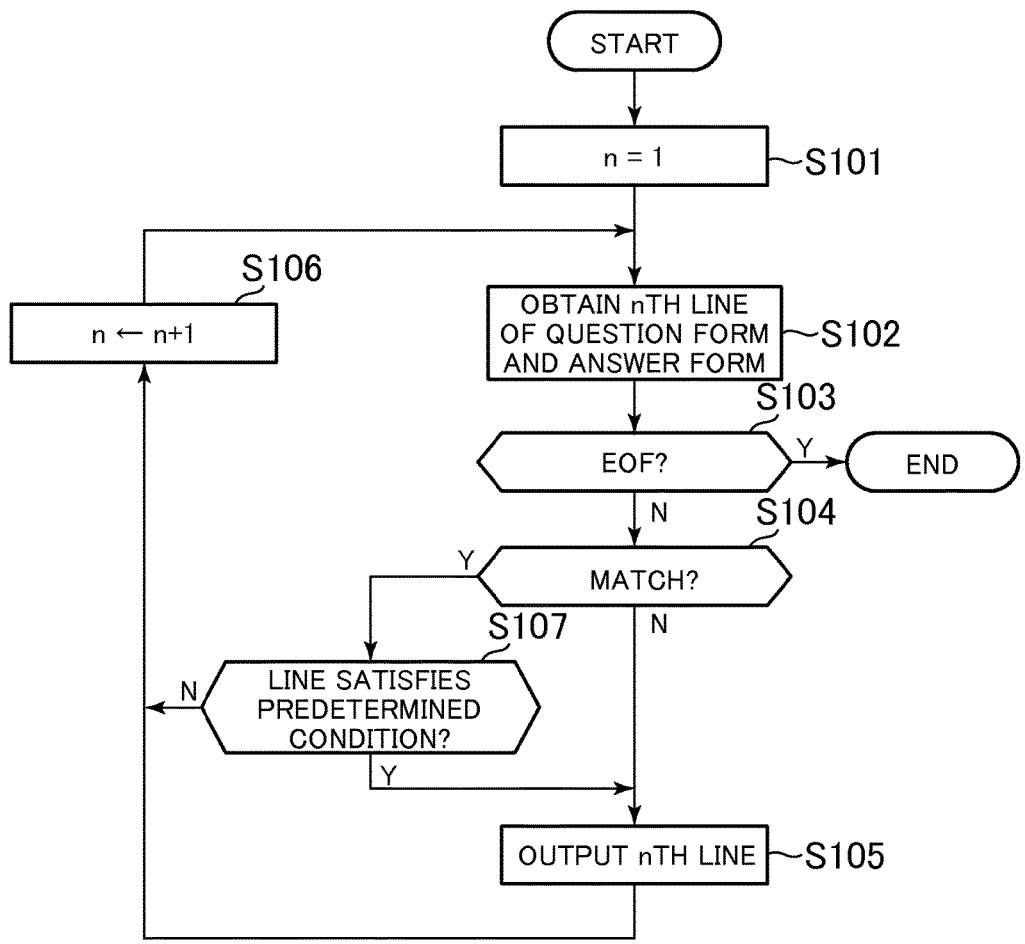
FIG. 12 A diagram illustrating a flow chart of the answer form processing according to the variation 1 of the present invention.
FIG. 13 A diagram illustrating another example of the revised answer form according to the variation 1 of the present invention.

FIG. 12 is a flow chart indicating the revised answer form generation processing for generating a revised answer form that includes the lines of the question sentences to be specified. As shown in FIG. 12, in the processing, 1 is substituted for a variable n, which indicates the number of lines (S101). Subsequently, data of nth line is extracted from each of the question form data and the answer form data (S102). At this time, if the data of nth line of the answer form is EOF (End Of File), processing is ended (S103). If not, the pieces of data extracted in S102 are compared to determine whether or not the pieces of data match (S104). If the pieces of data match, it is determined whether or not the nth line of the answer form satisfies the predetermined condition, for example, "including <at the beginning of the line" (S107). If the nth line does not satisfy the condition, the variable n is incremented by 1 (S106), and the processing returns to S102. If the nth line satisfies the condition, the data of the nth line of the answer form is added to the end of the data of the revised answer form (S105). Subsequently, the variable n is incremented by 1 (S106), and the processing returns to S102. In S104, the nth lines of the question form data and the answer form data do not match, the data of the nth line of the answer form is also added to the end of the data of the revised answer form (S105). Subsequently, the variable n is incremented by 1 (S106), and the processing returns to S102. With the above processing, the data of the revised answer form is generated such that the lines are omitted except for the lines of the question sentences that satisfy the condition and the lines to which the character "o" is added by the purchaser. Here, FIG. 13 shows an example of the revised answer form, which includes the first line of each of the question sentences 30 and 34, generated by the processing shown in FIG. 12. In this revised answer form, the lines to which the answerer has added the character and the lines of the question sentences that satisfy the condition are coupled together according to the original order to generate data of the revised answer form. In this way, it is possible to understand a pair of a question and an answer in a direct way, and easily recognize content of the answer form.

Instead of directly specifying the question sentences, lines of the options 32 and 36 of the question form may be specified first, and, based on the positions of the specified lines of the options 32 and 36, the lines of the question sentences in the answer form may be specified. In other words, the lines other than the specified lines of the options 32 and 36 may be specified as the lines of the question sentence. In order to specify the lines of the options 32 and 36, for example, when a plurality of lines that satisfy the predetermined condition are consecutive, the consecutive lines may be specified as the lines of the options 32 and 36 of the question form. Here, each line included in the options 32 and 36 includes "( )". As such, lines that satisfy the condition "including ( ) in a line" may be specified as the lines of the options 32 and 36. In addition, a shop that creates a question form may be notified of a condition of a line (e.g., including "." at the beginning of the line, or including "[ ]" at the end of the line) of the question sentences to be included in the revised answer form. If the shop follows the condition to create the question form, a line satisfying the condition may be specified as the line of the options.

Figure 14:
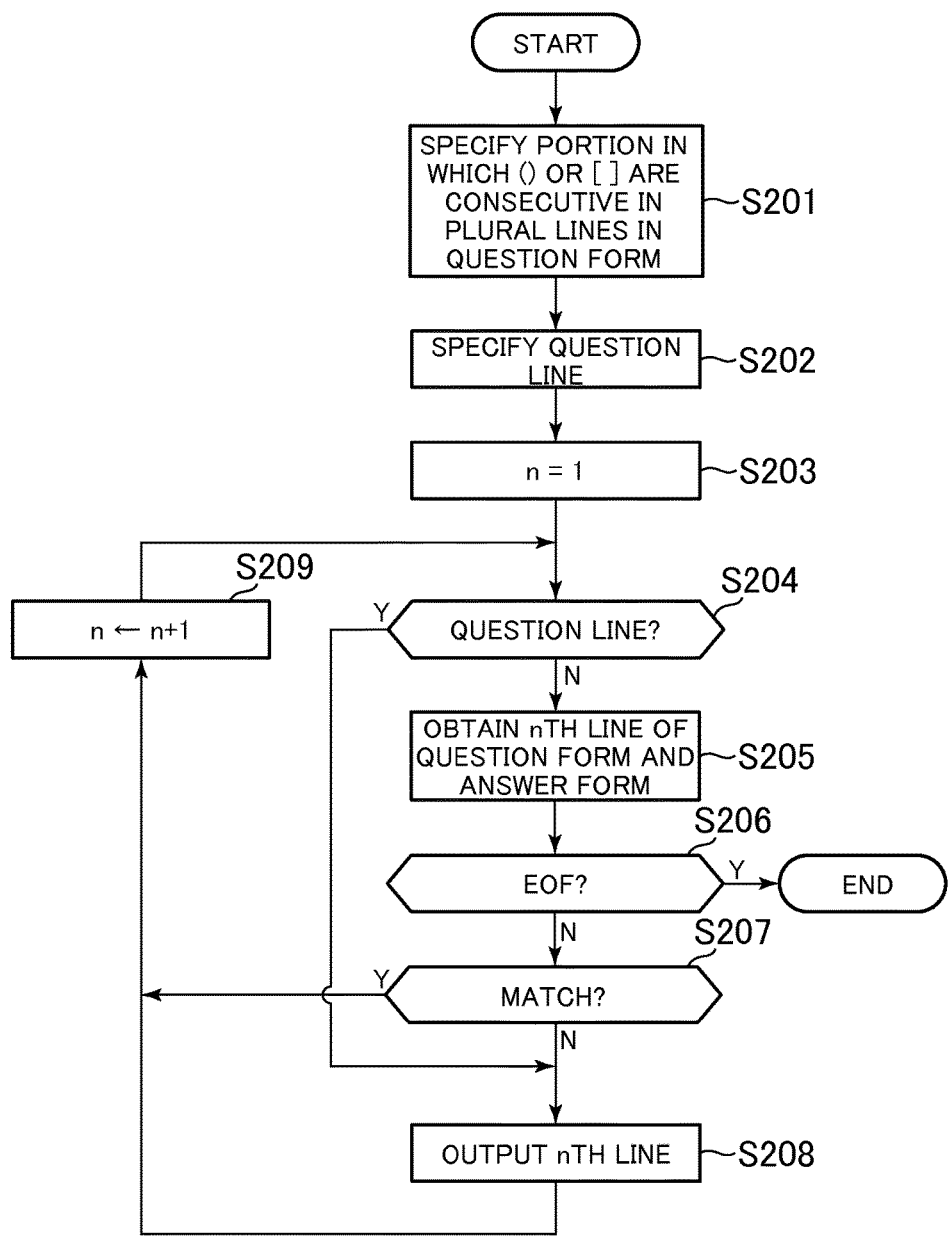
FIG. 14 A diagram illustrating a flow chart of the answer form processing according to variation 2 of the present invention.

FIG. 14 is a flowchart indicating another revised answer form generation processing for generating the revised answer form that includes the lines of the question sentences. As shown in FIG. 14, in the processing, a portion in which lines satisfying the predetermined condition are consecutive is specified (S201). Here, line numbers in a portion in which a plurality of lines including "( )" at the end are consecutive are specified, but depending on a rule for creating the question form, line numbers in a portion in which a plurality of lines including "( )" at the beginning are consecutive may be specified. The line numbers other than the line numbers specified in S201 are then specified as the line numbers of the question sentence (S202).

Subsequently, 1 is substituted for a variable n, which indicates the number of lines (S203). It is then determined whether or not n is included in the line numbers of the question sentences specified in S202 (S204). If not, the nth line of each of the question form data and the answer form data is extracted (S205). At this time, if the data of nth line of the answer form is EOF (End Of File), processing is ended (S206). If not, the pieces of data extracted in S205 are compared to determine whether or not the pieces of data match (S207). If the pieces of data match, the variable n is incremented by 1 (S209), and the processing returns to S204. If the pieces of data do not match, the data of the nth line of the answer form is added to the end of the data of the revised answer form (S208). Subsequently, the variable n is incremented by 1 (S209), and the processing returns to S204. With the above processing, the data of the revised answer form is generated such that the lines are omitted except for the lines of the question sentences to which the character "o" is added by the purchaser. Here, FIG. 15 shows an example of the revised answer form that includes the question sentences 30 and 34 and is generated by the processing shown in FIG. 14. In this revised answer form, the lines to which the answerer has added the character and the lines other than the lines of the options are coupled together according to the original order so as to generate data of the revised answer form. In this way, it is possible to include the question sentences 30 and 34 in the revised answer form, and, when checking the revised answer form, immediately understand which answer belongs to which question.

Further, in the revised answer form generation processing, if the generated revised answer form is not added with a line, the revised answer form may include a message prepared in advance, such as "no entry." As shown in FIG. 16, in a case where a portion of the question sentences is answered and the rest of the question sentences is not answered, it is preferable to record, in the revised answer form, whether the purchaser has answered or not for each question. FIG. 17 shows an example of the revised answer form corresponding to the answer form shown in FIG. 16. In FIG. 17, the revised answer form displays, for each question, the answer from the purchaser if the purchaser has answered the question, and the message "no entry" is shown if the purchase has not answered the question.

Figure 18:
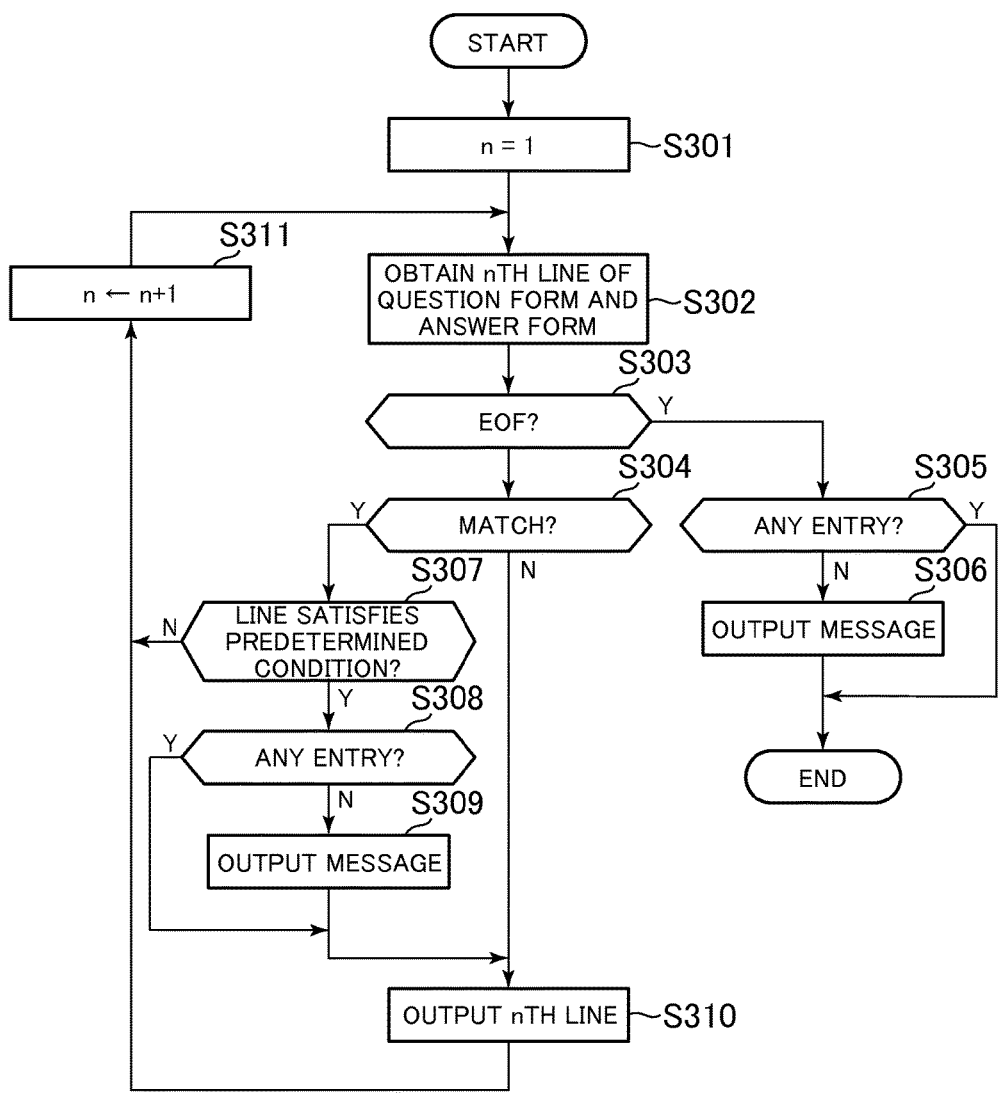
FIG. 18 A diagram illustrating a flow chart of the answer form processing according to the variation 3 of the present invention.

FIG. 18 is a flow chart showing the revised answer form generation processing for generating the revised answer form shown in FIG. 17. As shown in FIG. 18, in the processing, 1 is substituted for a variable n, which indicates the number of lines (S301). Subsequently, data of nth line is extracted from each of the question form data and the answer form data (S302). If the data of nth line of the answer form is not EOF (End Of File) (S303), the pieces of data extracted in S302 are compared to determine whether or not the pieces of data match (S304). If the pieces of data do not match, the data of the nth line of the answer form is added to the end of the data of the revised answer form (S310). Subsequently, the variable n is incremented by 1 (S311), and the processing returns to S302. If the pieces of data match, it is determined whether or not the nth line of the answer form satisfies the predetermined condition, for example, "including < at the beginning of the line" (S307). If the nth line does not satisfy the condition, the variable n is incremented by 1 (S311), and the processing returns to S302. If the nth line satisfies the condition, it is determined whether or not one or more lines have been added to the revised answer form from the last time the line satisfying the condition was found to this time (S308). If not, a line of the message "no entry" is added to the end of the revised answer form (S309), and then the data of the nth line of the answer form is added to the end of the revised answer form (S310). Subsequently, the variable n is incremented by 1 (S311), and the processing returns to S302. If it is determined one or more lines have been added to the revised answer form in S308, the processing skips S309.

In S303, if it is determined that the nth line of the answer form data is EOF, it is determined whether or not one or more lines have been added to the revised answer form from the last time the line satisfying the condition was found to this time (S305). If not, a line of the message "no entry" is added to the end of the revised answer form (S306), and the processing is ended. If one or more lines have been added, the processing skips S306. With the above processing, the data of the revised answer form is generated such that the lines are omitted except for the lines of the question sentences that satisfy the condition and the lines to which the character "○" is added by the purchaser, and the message "no entry" is added to the question sentences to which the purchaser has not answered. With this revised answer form data, it is possible to surely recognize which question is not answered.

Figures 19, 20, 21:
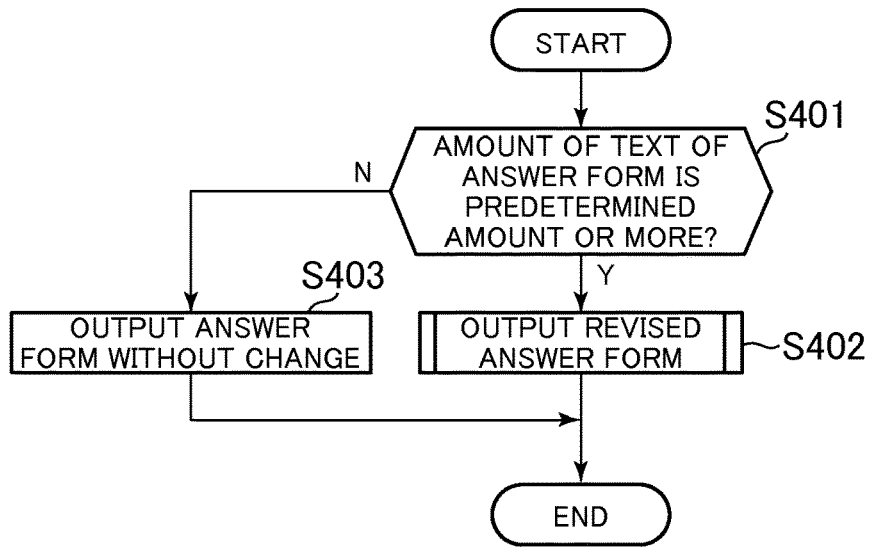
FIG. 19 A diagram illustrating a flow chart of the answer form processing according to variation 4 of the present invention.
FIG. 20 A diagram illustrating an example of the question form.
FIG. 21 A diagram illustrating an example of the answer form.

In a case where an amount of text of the answer form and the question form is small, there is little need to omit the same lines in the answer form and the question form to dispose the remaining lines adjacent in a line-by-line manner. As such, if the amount of text of the answer form and the question form is less than the predetermined amount, the revised answer form may not be generated and the answer form may be displayed without being changed on the review screen in FIG. 6 or the order review screen in FIG. 7. Here, the amount of text may be the total number of lines in the answer form or the question form, or the number of characters. Alternatively, the amount of text may be an amount of data. As shown in FIG. 19, the order information recording unit 58 and the order information review unit 60 determine whether or not an amount of text of the answer form is predetermined amount or more (S401). If the amount of text of the answer form is equal to or more than the predetermined amount, any of the revised answer form generation processing described above is executed (S402). If the amount of text of the answer form is less than the predetermined amount, the answer form is output without being changed. Subsequently, the order information recording unit 58 and the order information review unit 60 include the data output in S402 or S403 in web data of the review screen shown in FIG. 6 or the order review screen shown in FIG. 7. In S401, the amount of text of the answer form is checked, but an amount of text of the question form may, of course, be checked too. In this way, in a case where an amount of text is small (e.g., the number of lines is less than 10) as the question form shown in FIG. 20, the answer form shown in FIG. 21 is to be included in web data of the review screen shown in FIG. 6 or the order review screen shown in FIG. 7 without being changed.

According to the e-commerce system 1 as described above, only the necessary portions of the answer form generated by the purchaser are displayed on the review screen shown in FIG. 6 or the order review screen shown in FIG. 7, and thus the display space can be effectively used. In addition, the purchaser and the shop staff can immediately understand content of the answer. In the above, the example in which the present invention is applied to the question to the purchaser at the time of order of an item is described. However, the present invention may similarly be applied to other question forms, such as a question form for asking for a review after the purchaser uses the e-commerce system 1. Further, the answer form processing according to the embodiment of the present invention may be executed by a server computer such as the e-commerce server 4, or by a client computer such as the purchaser computer 6 or the shop computer 8. Alternatively, a portion of the answer processing according to the embodiment of the present invention may be executed by the server computer, and the rest of the processing may be executed by the client computer. The server computer may consist of a plurality of computers.

The invention claimed is:

1. An answer form processing system, comprising:
at least one processor; and
at least one memory device that stores a plurality of instructions, which when executed by the at least one processor, cause the at least one processor to:
obtain a question form from a storing unit for storing the question form, the question form including one or more lines of a question sentence and a plurality of consecutive lines of options corresponding to the question sentence, and being data in a multiline text file which is not structured;
obtain an answer form that indicates an answer for the question sentence from an answerer and is sent from an answerer's device, the answer form being data in a text format which is not structured and separate from the question form displayed at the answerer's device in one editable text box that includes the question sentence and the plurality of consecutive lines of options of the question form and generated at the answerer's device by adding one or more characters to the one or more lines in the question form, each of the lines indicating the option;
compare the question form and the answer form on a line-by-line basis with respect at least to the plurality of lines each of which indicates one of the plurality of options to determine whether each line in the answer form is identical to the corresponding line in the question form or not; and
output at least a part of each line in the answer form while restricting output of a line, which is one of the plurality of lines respectively indicating the plurality of options and is identical to the corresponding line in the question form, thereby outputting only a part of the answer form where the line indicating the option to which one or more characters are not added by the answerer is omitted and the line indicating the option to which one or more characters are added by the answerer is not omitted.

2. The answer form processing system according to claim 1, wherein the processor further specifies at least one of the plurality of lines indicating the question sentence in the answer form, and
does not restrict output of the specified line in the answer form.

3. The answer form processing system according to claim 2, Wherein the processor further specifies a line that matches a predetermined condition as a question sentence in the answer form.

4. The answer form processing system according to claim 2, wherein the processor further specifies the plurality of lines respectively indicating the plurality of the options in the question form, and also specifies at least one of the lines indicating the question sentence based on positions of the specified lines.

5. The answer form processing system according to claim 4, wherein, in a case where a plurality of lines that match the predetermined condition are consecutive, the processor further specifies the consecutive lines as the plurality of lines respectively indicating the plurality of options in the question form.

6. The answer form processing system according to claim 1, wherein the processor further does not restrict output of the line, in the answer form, that matches the corresponding line in the question form based on an amount of text in the question form or the answer form.

7. The answer form processing system according to claim 1, wherein the processor further outputs a predetermined message in a case where there is no line, in the answer form, that does not match the corresponding line in the question form.

8. An answer form processing method, comprising:
obtaining a question form from a storage, the question form including one or more lines of a question sentence and a plurality of consecutive lines of options corresponding to the question sentence, and being data in a multiline text file which is not structured;
obtaining an answer form that indicates an answer for the question sentence from an answerer and is sent from an answerer's device, the answer form being data in a text format which is not structured and separate from the question form, displayed at the answerer's device in one editable text box that includes the question sentence and the plurality of consecutive lines of options of the question form and generated by adding one or more characters to the one or more lines in the question form, each of the lines indicating the option;
comparing the question form and the answer form on a line-by-line basis with respect at least to the plurality of lines each of which indicates one of the plurality of options; and
outputting at least a part of, each line in the answer form while restricting output of a line, which is one of the plurality of lines respectively indicating the plurality of options and is identical to the corresponding line in the question form, thereby outputting only a part of the answer form where the line indicating the option to which one or wore characters are not added by the answerer is omitted.

9. A ion-transitory computer readable medium storing a program for causing a computer to perform the steps of:
obtaining a question form from a storage, the question form including one or more lines of a question sentence and a plurality of consecutive lines of options corresponding to the question sentence, and being data in a multiline text file which is not structured;
obtaining an answer form that indicates an answer for the question sentence from an answerer and is sent from an answerer's device, the answer form being data in a text format which is not structured and separate from the question form displayed at the answerer's device in one editable text box that includes the question sentence and the plurality of consecutive lines of options of the question form and generated by adding one or more characters to the one or more lines indicating the plurality of options in the question form, each of the lines indicating the option;
comparing the question form and the answer form on a line-by-line basis with respect at least to the plurality of lines each of which indicates one of the plurality of options; and
outputting at least a part of each line in the answer form while restricting output of a line, which is one of the plurality of lines respectively indicating the plurality of options and is identical to the corresponding line in the question form, thereby outputting only a part of the answer form where the line indicating the option to which one or more characters are not added by the answerer is omitted.

10. The answer form processing system according to claim 7, wherein the processor further does not restrict output of the Line, in the answer form, that matches the corresponding line in the question form based on an amount of text in the question form or the answer form.

11. The answer form processing system according to claim 3, wherein the processor further does not restrict output of the line, in the answer fonu, that matches the corresponding line in the question for based on an amountof text in the question form nr the answer form.

12. The answer form processing system according to claim 4, wherein the processor further does not restrict output of the line, in the answer form, that matches the corresponding line in the question form based on an amount of text in the question form or the answer form.

13. The answer form processing system according to claim 5, wherein the processor further does not restrict output of the line, in the answer form, that matches the corresponding line in the question form based on an amount of text in the question form or the answer form.

14. The answer form processing system according to claim 2, wherein the processor further outputs a predetermined message in a case where there is no line, in the answer form, that does not match the corresponding line in the question form.

15. The answer form processing system according to claim 3, wherein the processor further outputs a predetermined message in a case where there is no line, in the answer form, that does not match the corresponding line in the question form.

16. The answer form processing system according to claim 4, wherein the processor further outputs a predetermined message in a case where there is no line, in the answer form, that does not match the corresponding line in the question form.

17. The answer form processing system according to claim 5, wherein the processor further outputs a predetermined message in a case where there is no line, in the answer form, that does not match the corresponding line in the question form.

18. The answer form processing system according to claim 6, wherein the processor further outputs a predetermined message in a case where there is no line, in the answer form, that does not match the corresponding line in the question form.

19. The answer form processing method according to claim 8, wherein the processor further outputs a predetermined message in a case where there is no line, in the answer form, that does not match the corresponding line in the question form.

* * * * *